US012626357B2

(12) United States Patent
Melandri et al.

(10) Patent No.: US 12,626,357 B2
(45) Date of Patent: May 12, 2026

(54) METHOD FOR QUALITY ASSESSMENT OF A FOOD PACKAGE AND A PACKAGING SYSTEM

(71) Applicant: Tetra Laval Holdings & Finance S.A., Pully (CH)

(72) Inventors: Antonio Melandri, Rubiera (IT); Paolo Scarabelli, Reggio Emilia (IT); Mattia Verasani, San Martino in Rio (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 35 days.

(21) Appl. No.: 18/563,820

(22) PCT Filed: Apr. 27, 2022

(86) PCT No.: PCT/EP2022/061150
§ 371 (c)(1),
(2) Date: Nov. 22, 2023

(87) PCT Pub. No.: WO2022/248145
PCT Pub. Date: Dec. 1, 2022

(65) Prior Publication Data
US 2024/0233116 A1     Jul. 11, 2024

(30) Foreign Application Priority Data

May 28, 2021    (EP) .................................... 21176702

(51) Int. Cl.
*G06T 7/00*          (2017.01)
*G01N 21/84*         (2006.01)
(Continued)

(52) U.S. Cl.
CPC ......... *G06T 7/001* (2013.01); *G01N 21/8806* (2013.01); *G01N 21/90* (2013.01); (Continued)

(58) Field of Classification Search
CPC ... G01N 2021/8411; G01N 2021/8835; G01N 2021/8848; G01N 21/8806; G01N 21/90; (Continued)

(56) References Cited

U.S. PATENT DOCUMENTS 10,733,723 B2 * 8/2020 Diao ......................... G06T 7/10
11,138,710 B2 * 10/2021 Kotula .................... G06F 18/22
(Continued)

FOREIGN PATENT DOCUMENTS

JP          2009145246 A      7/2009
JP          2009156822 A      7/2009
(Continued)

OTHER PUBLICATIONS

International Search Report and Written Opinion for International PCT Application No. PCTEP2022/061150 dated Sep. 5, 2022 in 9 pages.

*Primary Examiner* — Boubacar Abdou Tchoussou
(74) *Attorney, Agent, or Firm* — Knobbe Martens Olson Bear LLP

(57)          ABSTRACT

A method for quality assessment of a food package in a packaging system comprising capturing a first and second sets of image data depicting the food package at first and second stations, respectively, wherein the first station comprises a first image capturing apparatus, and the second station comprises a second image capturing apparatus, wherein the second station is placed at a different location than the first station of a package transportation path, wherein the second image capturing apparatus is set up differently compared to the first image capturing apparatus, thereby resulting in that the food package is represented differently in the second image data compared to the first image data, and determining features by processing the first and second image data, comparing the features with reference data, and in case of match, transferring a positive
(Continued)

quality indication, else, transferring a negative quality indication.

20 Claims, 3 Drawing Sheets

(51) Int. Cl.

| | |
|---|---|
| *G01N 21/88* | (2006.01) |
| *G01N 21/90* | (2006.01) |
| *H04N 23/90* | (2023.01) |

(52) U.S. Cl.
CPC ..... *H04N 23/90* (2023.01); *G01N 2021/8411* (2013.01); *G01N 2021/8835* (2013.01); *G01N 2021/8848* (2013.01); *G06T 2207/10152* (2013.01); *G06T 2207/30128* (2013.01); *G06T 2207/30204* (2013.01)

(58) Field of Classification Search
CPC .............. G01N 21/9009; G01N 21/909; G06T 2207/10152; G06T 2207/30128; G06T 2207/30204; G06T 7/001; H04N 23/90
See application file for complete search history.

(56) References Cited

U.S. PATENT DOCUMENTS

| | | | | |
|---|---|---|---|---|
| 11,424,016 | B1 * | 8/2022 | Hoffman | ................ G16H 40/67 |
| 2018/0314866 | A1 | 11/2018 | Kotula | |
| 2018/0314867 | A1 * | 11/2018 | Kotula | ................ G06K 7/1413 |
| 2019/0362480 | A1 * | 11/2019 | Diao | ......................... G06T 7/10 |
| 2020/0049632 | A1 | 2/2020 | Weinstein et al. | |
| 2022/0214243 | A1 * | 7/2022 | Li | ............................ G01M 3/38 |

FOREIGN PATENT DOCUMENTS

| | | | | |
|---|---|---|---|---|
| JP | 2010-256313 | A | 11/2010 | |
| WO | WO 2020/210574 | A1 | 10/2020 | |
| WO | WO-2020254260 | A1 * | 12/2020 | ......... G06F 18/2135 |

* cited by examiner

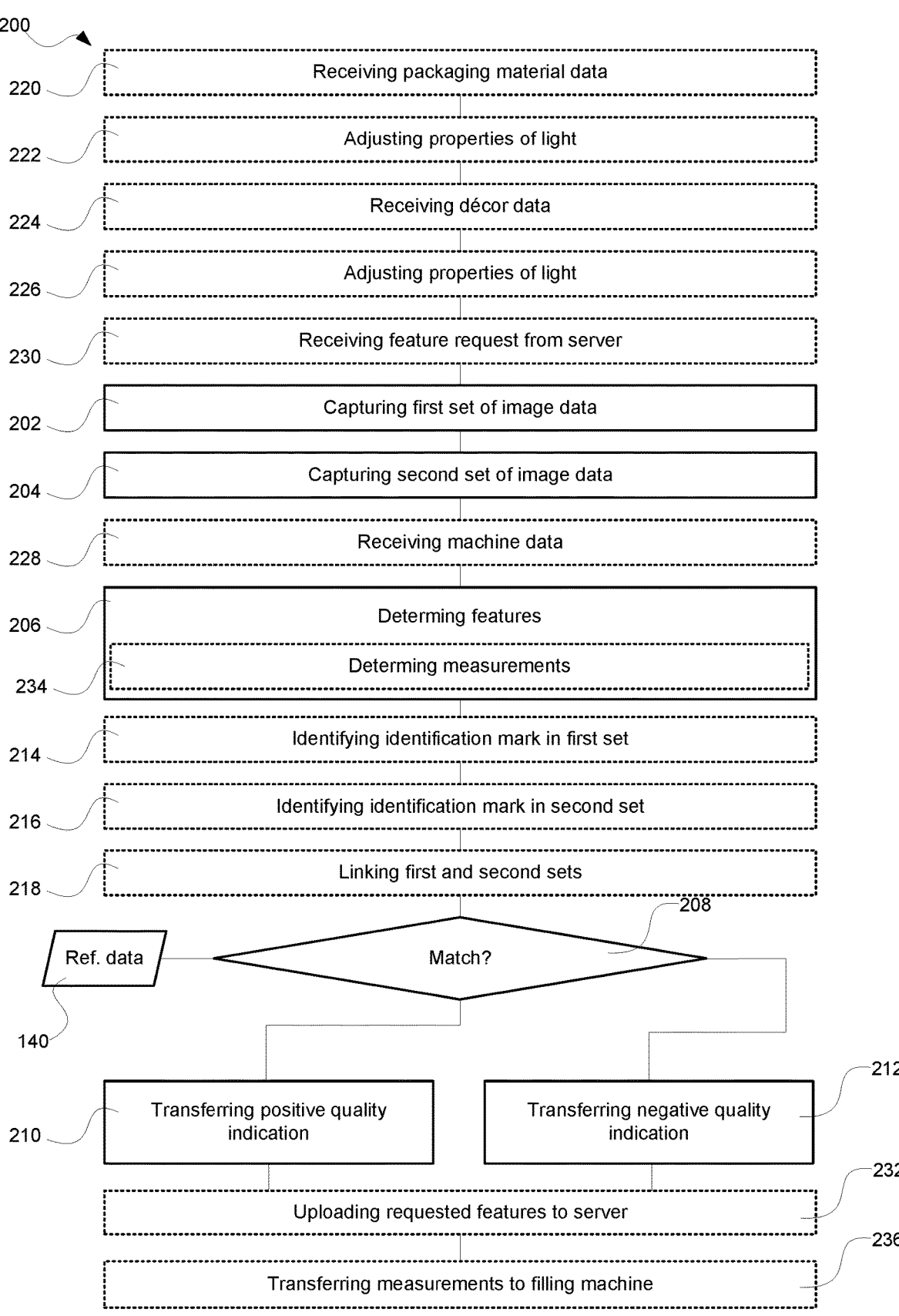

200

220 — Receiving packaging material data

222 — Adjusting properties of light

224 — Receiving décor data

226 — Adjusting properties of light

230 — Receiving feature request from server

202 — Capturing first set of image data

204 — Capturing second set of image data

228 — Receiving machine data

206 — Determing features

234 — Determing measurements

214 — Identifying identification mark in first set

216 — Identifying identification mark in second set

218 — Linking first and second sets

208

Ref. data

Match?

140

210 — Transferring positive quality indication

212 — Transferring negative quality indication

232 — Uploading requested features to server

236 — Transferring measurements to filling machine

*Fig. 5*

METHOD FOR QUALITY ASSESSMENT OF A FOOD PACKAGE AND A PACKAGING SYSTEM

TECHNICAL FIELD

The invention generally relates to quality assessment of food packages. More specifically, it is related to a method for quality assessment of a food package, a packaging system and a non-transitory computer-readable storage medium having stored thereon program code portions for implementing the method.

BACKGROUND ART

Today it is commonly known to have quality assessment stations as part of food packaging systems. Such stations may for example comprise a camera and a control unit configured to capture image data depicting a cap of a food package, compare the image data with reference image data and if deviations between the captured image data and the reference image data are identified, notify an operator that a cap application process should be looked into. By being able to detect quality issues, the risk of producing packages not fulfilling food safety standards can be reduced. This in turn provides for that the risk that food products not safe to consume are distributed to consumers can be reduced.

In addition to assuring food safety, the quality assessment stations are also closely linked to reducing food waste. By being able to quickly identify quality issues in food packages, the food packaging systems can quickly be halted and as an effect fewer food packages with quality issues are produced. This is beneficial in that fewer food packages need to be discarded, in turn resulting in less food waste. Thus, having quality assessment stations for food package systems in place also comes with the advantage that the environmental impact, such as the CO2 foot print, can be improved.

Several techniques for assessing image data for assessing cap application or the like within the packaging industry are known. During the last decades the development of cameras have been profound and the image quality of cameras of today provides possibilities not present 10-20 years ago. The development of image data processing devices has in a similar manner also been strong the last decades. In combination, this provides for that image data based quality assessment of food packages has been improved during the last years.

Even though the image based quality assessment stations are capable of detecting deviations both efficiently and reliably, there is a need to further improve the quality assessment to provide even better food safety and even less food waste.

SUMMARY

It is an object of the invention to at least partly overcome one or more of the above-identified limitations of the prior art. In particular, it is an object to provide a method for quality assessment of food packages such that the risk of producing food packages not meeting preset quality standard can be further reduced.

According to a first aspect it is provided a method for quality assessment of a food package in a packaging system. The method may comprise capturing a first set of image data depicting the food package at a first station in the packaging system, wherein the first station comprises a first image capturing apparatus, capturing a second set of image data depicting the food package at a second station in the packaging system, wherein the second station comprises a second image capturing apparatus, wherein the second station is placed at a different location than the first station of a package transportation path P of the packaging system, wherein the second image capturing apparatus is set up differently compared to the first image capturing apparatus, thereby resulting in that the food package is represented differently in the second image data compared to the first image data, and determining features by processing the first and second image data, comparing the features with reference data, and in case of match, transferring a positive quality indication, else, transferring a negative quality indication.

The features may be construed as a single or a combined characteristics for the package being assessed. For instance, the features may include a distance between a cap, placed on a top of the package, and a shortest distance to an edge of the top of the package. Such feature is herein referred to as a single characteristic. In case the features include a relationship, i.e. a quotient, between the shortest distance between the cap and an edge of the top and a longest distance between the cap and an edge of the top, such feature is herein referred to as combined characteristics. Put differently, the features may be construed as details of the package that may differ from package to package, such that the features can be used for identifying the package or for determining if the package is deviating from other packages being produced, thereby detecting if the package is not fulfilling pre-set quality standards. The features may include the pre-set quality standards, thereby making the comparison a direct assessment of the pre-set quality standards, but the features may also involve features that are indirectly linked to the pre-set quality standards, thereby making the comparison an indirect assessment of the pre-set quality standards.

The reference data may in format correspond to the features extracted from the first and second set of image data, but unlike being linked to the package being assessed the reference data is linked to packages deemed to fulfill the pre-set quality standards. Thus, in case of match, that is, the features correspond to the reference data, it may be decided that the package fulfil the pre-set quality standards, and the positive quality indication can be output. On the contrary, in case of no match, the negative quality indication can be output.

To provide improved reliability of the assessment, the reference data may be based on the packages deemed to fulfil the pre-set quality standards and also packages deemed not to fulfil the pre-set quality standards. By having information about both the packages deemed to fulfill the pre-set quality standards as well as information about the packages deemed not to fulfill, a more reliable reference data may be provided.

An advantage with having two stations set up differently is that the image data captured at the two stations may in combination provide more complete information about a state of the package.

The different locations along the package transportation path P should be construed broadly. For instance, the first station and second station may be placed to capture image data depicting an upper portion and a lower portion of the package simultaneously. Put differently, the different locations do not have to be at different points of time.

The method may further comprise identifying an identification mark in the first set of image data, identifying the identification mark of the second set of image data, and linking the first and second image data sets to the food package.

An advantage with having the identification mark is that the two sets of image data can be linked together reliably. In addition for linking the two sets of image data together, the identification mark may also be used for identifying the package at a later stage.

The identification mark may be a printed mark provided on the food package.

A second lighting arrangement may be provided with a polarized filter such that second light emitted by the second lighting arrangement is transformed into polarized light and reflected by the food package before reaching the second image capturing apparatus, and a first lighting arrangement is provided without a polarized filter such that first light emitted by the first lighting arrangement is reflected by the food package and received as unpolarized light by the first image capturing apparatus.

Using unpolarized light in one of the stations comes with the benefit that dents may be identified by using the reflections of the unpolarized light. Using polarized light on the other hand comes with the advantage that text and other printed information on the package is depicted in a way such that this can be recognized more easily. Thus, the combination of the two, i.e. having two stations using both alternatives, provides for that different aspects can be assessed in different station in combination resulting in an improved quality assessment.

The first set of image data generated by the unpolarized light received by the first image capturing apparatus may be used for detecting dents in the food package.

The second set of image data generated by the polarized light received by the second image capturing apparatus may be used for checking printed text on the food package.

The first lighting arrangement may be set up physically different compared to the second lighting arrangement such that the first light is reflected differently by the food package compared to the second light.

The method may further comprise receiving packaging material data and/or recipe data, wherein the packaging material data comprises information about type of material used in a packaging material of the food package and the recipe data comprises information about the food product filled into the food package, adjusting properties of the first light and/or the second light based on the packaging material data and/or the recipe data.

An advantage with taking into account the packaging material data and/or recipe data is that the quality issues linked to a specific packaging material or a specific product may be addressed, thereby providing for that more reliable quality assessment of the package can be achieved.

The method may further comprise receiving décor data, wherein the décor data comprises information about a print provided on the food package, adjusting properties of the first light and/or the second light based on the décor data.

By having information about the décor of the packaging material and by adapting the lighting in accordance with the décor, the image data generated can provide for that an improved quality assessment can be made.

The step of determining the features may further comprise determining a number of measurements associated to the features, and the method may further comprise transferring the measurements to the filling machine such that settings can be adjusted accordingly.

The method may further comprise receiving machine data linked to the food package, wherein the machine data comprises information about machine components and/or machine settings of the packaging system used when producing the food package, wherein the step of determining the features is made by processing the first and second image data in combination with the machine data.

An advantage with taking into account the machine data is that features related to components of the filling machine soon to be replaced can be addressed specifically. For instance, in case a transversal sealing system of the filling machine is soon to be replaced, features related to the transversal sealing may be addressed specifically. By doing so, the risk that quality issues are overlooked can be reduced. In addition, it provides the possibility to extend the life time of the components since the features related to these, when being soon to be replaced or, put differently, being close to expected life time, are monitored more closely.

The first station may be placed upstream a cap applicator and the second station may be placed downstream the cap applicator, wherein the features comprise a degree of rotation of a cap, applied onto the food package by the cap applicator, relative to the food package, wherein the cap is rotationally asymmetric.

As an alternative or as a complement, when having the first station placed upstream the cap applicator and the second station placed downstream the cap applicator, the features may comprise a pre-laminated hole position determined using the first set of image data and a cap position determined using the second set of image data. In this way it is made possible to assure that the cap is placed correctly with respect to the pre-laminated hole.

The method may further comprise receiving a feature request from a server comprising a database holding the reference data, wherein one or more requested features specified in the feature request are determined in the step of determining the features by processing the first and second image data, and uploading the one or more requested features to the server, thereby closing gaps in the database.

An advantage with this method is that in case there is too few data points in parts of the reference data in order to make reliable comparisons, feature requests can be made to close these gaps. Put differently, in addition to capturing data that can be used for a specific package, the first and second station can capture data that can be used for providing reliable reference data.

According to a second aspect it is provided a packaging system comprising a first station comprising a first image capturing apparatus configured to capture a first set of image data depicting a food package, a second station comprising a second image capturing apparatus configured to capture a second set of image data depicting the food package, wherein the second image capturing apparatus is set up differently compared to the first image capturing apparatus, thereby resulting in that the food package is represented differently in the second image data compared to the first image data, a controller comprising a feature determination module configured to:

determine features by processing the first and second image data, a comparison module configured to:

compare the features with reference data, and in case of match, to transfer a positive quality indication, else, to transfer a negative quality indication.

The same features and advantages as presented with respect to the first aspect also apply to this second aspect.

According to a third aspect it is provided a non-transitory computer-readable storage medium having stored thereon program code portions for implementing the method according to the first aspect when executed on a device having processing capabilities.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 generally illustrates a packaging system.

FIG. 5 is a flowchart illustrating a method for quality assessment of the food package in the packaging system.

DETAILED DESCRIPTION

Figure 1:
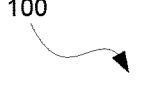

With reference to FIG. 1, a packaging system 100 is generally illustrated by way of example. In this particular example, a food package 102 is transferred on a conveyor band 104 along a package transportation path P from a filling machine 106, such as a roll-fed carton packaging machine, to a cap applicator 108 in which a cap 110 is applied onto the food package 102. As illustrated, a first station 112 with a first image capturing apparatus 114 and a first lighting arrangement 116 can be provided downstream the filling machine 106, but upstream the cap applicator 108. Downstream the cap applicator 108, a second station 118 provided with a second image capturing apparatus 120 and a second lighting arrangement 122 can be provided. An advantage with having two different stations for quality assessment of the food package 102 is that image data can be captured in different manners. For instance, by having the first and second lighting arrangements 116, 122 set up such that angles between incoming light—first light 162 in the first station 112 and second light 164 in the second station 118—and a top of the food package 102 are different. The different angles, illustrated as a and B in FIG. 1, can result in that different reflections occur in the first and second stations 112, 118. This in turn provides for that the information from the two stations combined can provide for that a more reliable quality assessment can be made.

As indicated above, the filling machine 106, sometimes also referred to as packaging machine, may be a roll-fed filling machine, such as a Tetra Brik™ filling machine marketed by Tetra Pak™. To form and fill the packages 102, the filling machine 106 may receive packaging material 124, herein illustrated as a reel with carton-based packaging material, and food product 126. The packaging material 124 may be printed with a décor before being fed into the filling machine 106 or the décor may be printed as part of the steps performed in the filling machine 106. A combination between the two may also be used, i.e. that part of the décor is printed before the packaging material 124 is fed into the filling machine 106 and part of the décor is printed in the filling machine 106. In addition to printing the décor, product related information, such as best before date, may be printed in or downstream the filling machine by a separate printer.

The first and second station 112, 118 may be set up differently in a number of different ways. As suggested above, the angles of the incoming light may be different in the first and second station 112, 188, thereby resulting in different reflections on the package 102. Other possibilities is to have different spectral properties of the incoming light, different number of light sources used, differently arranged light sources, different types of shielding for surrounding light, different intensity of the incoming light, etc.

After a first set of image data 128 is captured by the first image capturing apparatus 114 and a second set of image data 130 is captured by the second image capturing apparatus 120, these can be transferred to a controller 132. The transfer of image data may be made via wire, but also wireless. The controller 132 may be placed close to the first and second stations 112, 118, but it may also be placed remotely.

In the controller 132, a feature determination module 134 may be used for determining features 136 in the first and second sets of image data 128, 130. Such features may for instance be how the cap 110 is placed in relation to how a cut out in the packaging material 12, sometimes referred to as pre-laminated hole, is placed. The features may also involve reflections in the packaging material 124 caused by the incoming light. Dents and other types of deformations of the packages 102 may have an effect on the reflections and by capturing reflections from different stations 112, 118, the first and second image data 128, 130 from these two may in combination provide for that the dents or other deformations can be identified more reliably compared to only using a single station.

Once the features 136 are determined, these are transferred to a comparison module 138 in which they are compared with reference data 140. The reference data 140 may be data based on a plurality of packages 102 known to fulfill quality standards, e.g. packages without dents or other deformations and packages with the caps 110 placed in alignment with the cut outs in the packaging material. The reference data 140 may be retrieved from a server 142 comprising a database 144, in which the reference data 140 is stored. By having the reference data 140 stored in the server 142, data from a large number of packaging systems 100 can be collected such that statistically reliable reference data can be achieved. Even though not illustrated, operator input may also be received by the server 142 such that the reference data 140 can be generated.

The comparison module 138 may output a positive quality indication 146 if the features 136, which also may be referred to as feature data, match the reference data 140, i.e. the package 102 is deemed to be visually similar to packages known to fulfill quality standards. On the contrary, in case there is no match, a negative quality indication 148 may be output. The comparison module 138, as well as the feature determination module 134 and the server 142, may be based on artificial intelligence, i.e. the feature determination module 134 and the comparison module 138 may in full or in part decide which features to assess and also how to compare the features and the reference data. If using artificial intelligence, neural networks may be used.

In case there are gaps in the database 144, i.e. additional information is needed to be able to provide the reference data 140 required to make reliable assessments of the packages 102, e.g. too few data points related to a certain type of opening device are available, a feature request 150 may be transferred from the server 142 to the first station 112 and/or the second station 118. In this way, the two stations 112, 118 may be configured such that the first and second set of image data 128, 130 provides information related to the feature addressed in the feature request 150. Put differently, in addition to collect data that can be used for assessing a specific package, the first and second stations 112, 118 may also be used for continuously improving the reference data 140 used in the comparison module 138.

Since different packaging material 124 may have different specifications, e.g. the packaging material 124 may comprise different material, different thickness, and different number of layers, information about the packaging material 124 being used may be provided to the packaging system 100 in the form of packaging material data 152. Based on the packaging material data 152, settings of the first and second station 112, 118 may be adapted to provide for that the first and second set 128, 130 of image data contain information that makes it possible to make a more reliable quality assessment. The packaging material data 152 may also be provided to the controller 132 and/or the server 142.

In a similar manner, décor data 154 may be provided to the first and second stations 112, 114 as well as to the controller 132 and the server 142. By using the décor data 154, providing information about printed pattern provided on the packaging material 124, it is made possible to adapt the first and/or second lighting arrangement 116, 122 such the spectral properties in these two are adapted to meet the specific décor of the package 102 being assessed.

In addition or as an alternative, machine data 156 may also be used as input to the first and second stations 112, 118, and also as input to the controller 132 and/or the server 142. The machine data 156 can comprise information about machine components and/or machine settings of the packaging system 100 used when producing the package 102. This is advantageous in that, for instance, specific features may be chosen to make sure that effects caused by the machine settings and/or the machine components are addressed. For instance, in case a transversal sealing system of the filling machine 106 is soon to be replaced, there may be an increased risk that a transversal sealing of the package 102 does not meet quality standards, and as an effect features related to the transversal sealing may be prioritized.

Recipe data 157, that is, information related to the food product 126 and the processing of the food product 126, may also be taken into account to make sure that features are chosen in a way such that an improved quality assessment is made possible. For instance, in case the food product 126 comprises seeds, there may be an increased risk that the transversal sealing is affected by that the food product 126, more particularly the seeds, is caught in the transversal sealing with the effect that the transversal sealing is negatively affected. The recipe data 157 may be input to the first and second station 112, 118, as well as the controller 132 and the server 142.

As discussed above, the reflections on the package 102 may be used for detecting dents or other deformations in the package 102. It has been realized that unpolarized light 168 can be used for this purpose. On the other hand, to be able to provide image data in which text or other printed information provided on the packaging material 124 is depicted in a way such that the text can be recognized, polarized light 166 can be used. As illustrated, the unpolarized light 168 can be used in the first station 112 and the polarized light 166 can be used in the second station 118. To form the polarized light 166, a polarization filter 158 can be placed in front of the second lighting arrangement 122. A polarization filter 159 may also be placed in front of the second image capturing apparatus 120 to provide for that the polarized light 166 emitted from the second lighting arrangement 122 and passed through the polarization filter 158, placed in front of the second lighting arrangement, reaches the second image capturing apparatus 120. As an alternative to having the polarization filter 159 placed in front of the second image capturing apparatus 120, an image sensor of the second image capturing apparatus 120 may be configured such that only the polarized light 166 is registered. Sometimes such image sensor is referred to as polarized image sensor.

An identification mark 160 can be used to identify the package 102 and thereby provide that the first set of image data 128 and the second set of image data 130 related to the same package 102 can be linked. The identification mark 160 may be a printed mark, such as a QR code or a DataMatrix, but it may also be a mark integrated in the packaging material 124. For instance, magnetic particles may be integrated in the packaging material 124 such that the package 102 can be provided with a unique identification. It is also possible to trace the package 102 throughout the packaging system 100, and by keeping track of the package 102 be able to link the first and second set of image data 128, 130 without any identification mark 160 provided on the package 102. It is further possible to combine the two approaches, i.e. having the identification mark 160 on the package 102 and trace the package 102, to provide an even more reliable process for linking the two sets of image data.

The positive and negative quality indication 146, 148 may comprise measurements 170, i.e. numerical data related to the features. For instance, a distance between the transversal sealing and the cap 110 may be determined and form part of the measurements 170. This information may be fed back to the filling machine 106, and/or the cap applicator 108 (even though not illustrated), to provide for that settings may be adjusted to meet set quality standards. For instance, in case the distance between the transversal sealing and the cap 110 is greater than a set value, but still within a tolerance range, the cap applicator can be adjusted to provide for that coming caps 110 are applied closer to the transversal sealing.

Figures 2, 3, 4:
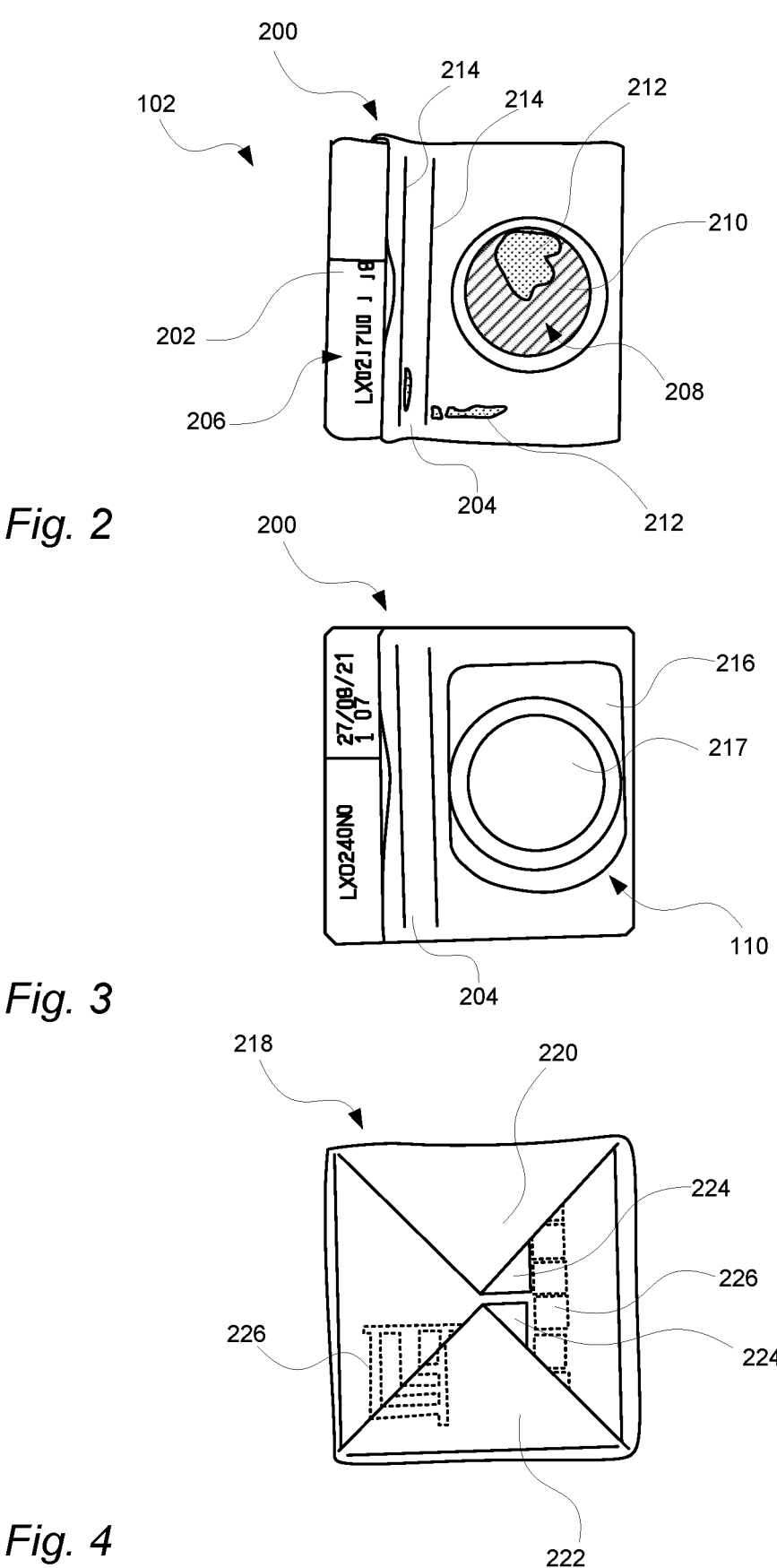
FIG. 2 illustrates a top of a package according to a first example.
FIG. 3 illustrates the top of the package according to a second example.
FIG. 4 illustrates a bottom of the package according to a third example.

FIG. 2 illustrates a top 200 of the package 102 in further detail by way of example. In this particular example, the cap 110 has not yet been applied, and thus this example may constitute an example of the package 102 when passing the first station 112. The package 102 illustrated by way of example is a carton-based package provided with a longitudinal sealing 202. The longitudinal sealing 202 can be formed by that one side of the packaging material 124 is placed on top of the other side, and then heat sealed together. A transversal sealing 204 can be provided as well. As illustrated, a top fin in which the transversal sealing 204 is provided can be folded down onto the top 200 of the package 102 such that a substantially flat top surface of the package 102 can be achieved. To identify the package 102 and/or provide information related to process of producing the package 102 and/or the food product 126, printed information 206 can be provided on the package 102.

In the example illustrated, the cap 110 is to be applied in a later stage. In the packaging material 124 as well as on the top 200 of the package 102, formed by the packaging material 124, a carton layer cut out 208 can be provided. As the name suggest, the carton layer cut out 208 can be a part of the top 200 in which a carton layer of the packaging material 124 has been removed. By doing so, cutting elements of the cap 110, to be applied, can penetrate the packaging material 124. An effect of having the carton layer removed is that an Aluminum layer 210 is made visible. Reflections 212, caused by the first light 162 from the first lighting arrangement 116, may occur on the Aluminum layer 210 as well as other parts of the package 102 in which the carton layer is not removed. Due to the different nature of Aluminum and carton, the reflections 212 will however be different in areas with the carton layer removed, i.e. the carton layer cut out 208, and other areas with the carton layer present. By having two stations, it is possible to address the different needs in an improved manner. Folding lines 214, also referred to as weakening lines, may be present on the top 200 and may be used for determining the features 136 and/or the measurements 170.

FIG. 3 illustrates another example of the top 200 of the package 102. However, unlike the example illustrated in FIG. 2, the example illustrated in FIG. 3 is the top 200 with the cap 110 applied. Since the cap 110 is placed on top of the carton layer cut out 208, the Aluminum layer 210 is not visible in this example. If using the packaging system 100 arranged in line with the example illustrated in FIG. 1, the example illustrated in FIG. 3 may be an example of how the package 102 can be arranged when passing the second station 118, i.e. downstream the cap applicator 108.

The cap 110 can have a cap base 216, attached to the top 200 of the package 102, and a lid 217 screwed onto a spout forming part of the cap base 216. To assure that the cap 110 is properly attached to the top 200, an angle between the transversal sealing 204 and a side of the cap base 110 can be determined and used as one of the features 136. The angle between the transversal sealing 204 and the side of the cap base 110 may be used as one of the measurements 170.

FIG. 4 illustrates a third example of the package 102. Unlike the examples illustrated in FIGS. 2 and 3, the example illustrated in FIG. 4 is a bottom 218 of the package 102. In this example as well as the examples illustrated in FIGS. 2 and 3, the package 102 is a carton package, more particularly the package 102 is formed from a web of packaging material 124 comprising a number of layers, of which at least one layer is a carton layer.

On the top 200 illustrated in FIGS. 2 and 3, flaps are folded down onto side panels of the package 102 and is thereby not visible in the examples illustrated. However, in the bottom 218, a first and a second bottom flap 220,222 can be folded inwards and towards the transversal sealing provided in a bottom fin 224, thereby providing a more steady base for the package 102. Angles of the first and second bottom flaps 220, 222 as well as a distance between the two may form part of the features 136 and the numerical data associated thereto may form part of the measurements 170. Printed reference data 226 may be provided on the bottom 218 and may also on its own or in combination with e.g. the first and second bottom flaps 220, 222 form basis for the features 136 and/or the measurements 170.

FIG. 5 is a flowchart illustrating a method 200 for quality assessment of the food package 102 in the packaging system 100. The method 200 may comprise capturing 202 the first set of image data 128 depicting the food package 102 at the first station 112 in the packaging system, wherein the first station 112 can comprise the first image capturing apparatus 114, capturing 204 the second set of image data 130 depicting the food package 102 the second station 118 in the packaging system 100, wherein the second station 118 comprises the second image capturing apparatus 120, wherein the second station 118 can be placed at a different location than the first station 112 of a package transportation path P of the packaging system 100, wherein the second image capturing apparatus 120 can be set up differently compared to the first image capturing apparatus 114, thereby resulting in that the food package 102 is represented differently in the second image data 130 compared to the first image data 128, and determining 206 the features 136 by processing the first and second image data 128, 130, comparing 208 the features with the reference data 140, and in case of match, transferring 210 the positive quality indication 146, else, transferring 212 the negative quality indication 148. Optionally, the method may further comprise identifying 214 the identification mark 160 of the first set of image data 128, identifying 216 the identification mark 160 of the second set of image data 130, and linking 218 the first and second image data sets 128, 130 to the food package 102.

Optionally, the method may further comprise receiving 220 the packaging material data 152 and/or the recipe data 157, wherein the packaging material data 152 comprises information about type of material used in a packaging material 124 of the food package 102 and the recipe data 157 comprises information about the food product 126 filled into the food package 102, adjusting 222 properties of the first light 162 and/or the second light 164 based on the packaging material data 152 and/or the recipe data 157.

Optionally, the method may further comprise receiving 224 the décor data 154, wherein the décor data 154 comprises information about a print provided on the food package 102, adjusting 226 properties of the first light 162 and/or the second light 164 based on the décor data 154.

Optionally, the method may further comprise receiving the machine data 228 linked to the food package 102, wherein the machine data 156 comprises information about machine components and/or machine settings of the packaging system 100 used when producing the food package 102, wherein the step of determining 206 the features 136 is made by processing the first and second image data 128, 130 in combination with the machine data 156.

Optionally, the method may further comprise receiving 230 the feature request 150 from the server 142 comprising the database 144 holding the reference data 136, and uploading 232 the one or more requested features 136 to the server (142), thereby closing gaps in the database 144.

From the description above follows that, although various embodiments of the invention have been described and shown, the invention is not restricted thereto, but may also be embodied in other ways within the scope of the subject-matter defined in the following claims.

The invention claimed is:

1. A method for quality assessment of a food package in a packaging system, said method comprising:

prior to performing at least a portion of packaging the food package, capturing a first set of image data depicting the food package at a first station, wherein the first station comprises a first image capturing apparatus, capturing a second set of image data depicting the food package after performing at least the portion of packaging the food package at a second station, wherein the second station comprises a second image capturing apparatus, wherein the second image capturing apparatus is configured differently compared to the first image capturing apparatus, wherein the food package is represented differently in the second set of image data compared to the first set of image data, wherein the first station is placed upstream of a third station in a package transportation path and the second station is placed downstream of the third station, and wherein the third station is configured to perform at least the portion of packaging the food package, determining features associated with the portion of packaging the food package by processing the first set of image data and the second set of image data based on one or more physical attributes depicted on the food package prior to performing at least the portion of packaging the food package, comparing the features with reference data associated with a quality standard for at least the portion of packaging the food package, in case of a match between the features and reference data, transferring a positive quality indication, and in case of a mismatch between the features and reference data, transferring a negative quality indication.

2. The method according to claim 1, further comprising:

identifying an identification mark in the first set of image data, identifying the identification mark in the second set of image data, and linking the first set of image data and the second set of image data to the food package.

3. The method according to claim 2, wherein the identification mark comprises a printed mark provided on the food package.

4. The method according to claim 1, wherein a second lighting arrangement is provided including a polarized filter such that a second light emitted by the second lighting arrangement is transformed into polarized light and reflected by the food package before reaching the second image capturing apparatus, and a first lighting arrangement is provided without the polarized filter such that a first light emitted by the first lighting arrangement is reflected by the food package and received as unpolarized light by the first image capturing apparatus.

5. The method according to claim 4, wherein the first set of image data is generated by the unpolarized light received by the first image capturing apparatus and is configured for detecting dents in the food package.

6. The method according to claim 4, wherein the second set of image data is generated by the polarized light received by the second image capturing apparatus and is configured for checking printed text on the food package.

7. The method according to claim 4, wherein the first lighting arrangement is set up physically different compared to the second lighting arrangement such that the first light is reflected differently by the food package compared to the second light.

8. The method according to claim 4, further comprising:

receiving packaging material data and/or recipe data, wherein the packaging material data comprises information about a type of material used in a packaging material of the food package and the recipe data comprises information about a food product filled into the food package, and adjusting properties of the first light and/or the second light based on the packaging material data and/or the recipe data.

9. The method according to claim 4, further comprising:

receiving décor data, wherein the décor data comprises information about a print provided on the food package, and adjusting properties of the first light and/or the second light based on the décor data.

10. The method according to claim 1, further comprising transferring measurements to the packaging system such that settings can be adjusted accordingly, wherein determining the features comprises determining measurements associated with the features.

11. The method according to claim 1, further comprising receiving machine data linked to the food package, wherein the machine data comprises information about machine components and/or machine settings of the packaging system used when producing the food package, and wherein determining the features comprises processing the first set of image data and the second set of image data in combination with the machine data.

12. The method according to claim 1, wherein the third station comprises a cap applicator, and wherein the portion of packaging the food package comprises a degree of rotation of a cap, applied onto the food package by the cap applicator, relative to the food package, wherein the cap is rotationally asymmetric.

13. The method according to claim 1, further comprising:

receiving a feature request from a server comprising a database holding the reference data, wherein one or more requested features specified in the feature request are determined when determining the features by processing the first set of image data and the second set of image data, and uploading the one or more requested features to the server, thereby closing gaps in the database.

14. A packaging system comprising:

a first station comprising a first image capturing apparatus configured to capture a first set of image data depicting a food package prior to performing at least a portion of packaging the food package, a second station comprising a second image capturing apparatus configured to capture a second set of image data depicting the food package after performing at least the portion of packaging the food package, wherein the second image capturing apparatus is configured differently compared to the first image capturing apparatus, and wherein the food package is represented differently in the second set of image data compared to the first set of image data, wherein the first station is placed upstream of a third station and the second station is placed downstream of the third station, and wherein the third station is configured to perform at least the portion of packaging the food package, and a controller configured to:

determine features associated with the portion of packaging the food package by processing the first set of image data and the second set of image data based on one or more physical attributes depicted on the food package prior to performing at least the portion of packaging the food package, compare the features with reference data associated with a quality standard for at least the portion of packaging the food package, in case of a match between the features and the reference data, transfer a positive quality indication, and in case of a mismatch between the features and the reference data, transfer a negative quality indication.

15. A non-transitory computer-readable storage medium storing instructions that, when executed by a processor, cause the processor to carry out the method according to claim 1.

16. The packaging system according to claim 14, wherein the controller is further configured to transfer measurements to the packaging system such that settings can be adjusted accordingly, wherein determining the features comprises determining measurements associated with the features.

17. The method according to claim 10, wherein the third station comprises a cap applicator configured to apply a cap on the food package, wherein the measurements associated with the features comprise a distance between the cap and an edge of a top of the food package.

18. The method according to claim 10, wherein the third station comprises a cap applicator configured to apply a cap on the food package, wherein the measurements associated with the features comprise a quotient between a shortest distance between the cap and an edge of a top of the food package and a longest distance between the cap and another edge of the top of the food package.

19. The method according to claim 12, wherein the one or more physical attributes comprise at least a pre-laminated hole.

20. The method according to claim 1, further comprising updating the reference data based on the food packages associated with the positive quality indication.

* * * * *